United States Patent [19]

Davis et al.

[11] 4,112,974
[45] Sep. 12, 1978

[54] REVERSING VALVE

[75] Inventors: Gerald L. Davis; Timothy C. Scott, both of Bristol, Va.

[73] Assignee: Sundstrand Corporation, Rockford, Ill.

[21] Appl. No.: 736,878

[22] Filed: Oct. 29, 1976

[51] Int. Cl.² .................. F16K 31/04; F16K 31/52
[52] U.S. Cl. .................. 137/625.29; 251/11; 251/263; 236/100; 62/324
[58] Field of Search .................. 137/625.29; 251/11, 251/58, 138, 263; 236/100; 62/324

[56] References Cited

U.S. PATENT DOCUMENTS

| 810,653 | 1/1906 | Hyatt | 251/263 X |
|---|---|---|---|
| 2,245,834 | 6/1941 | Sparrow | 251/138 X |
| 2,976,701 | 3/1961 | Greenawalt | 137/625.29 X |
| 3,782,349 | 1/1974 | Kamo et al. | 251/11 X |
| 3,912,219 | 10/1975 | Weinstein | 251/11 X |
| 3,967,779 | 7/1976 | Logsdon | 251/11 X |

Primary Examiner—Arnold Rosenthal
Attorney, Agent, or Firm—Wegner, Stellman, McCord, Wiles & Wood

[57] ABSTRACT

A reversing valve for use in air conditioning systems and the like for controlling the flow of fluid between a plurality of ports, the valve including a valve body with a chamber communicating with each of the ports, and a valve member mounted in the chamber for movement between two positions to control the flow. Means for moving the valve member are located to one side and generally centrally of the valve member, and include a reciprocable operating plunger engaging a grooved ramp in the valve member which forms a cam. A spring is provided at one end of the valve member to urge the valve member to one position as the plunger is retracted.

10 Claims, 4 Drawing Figures

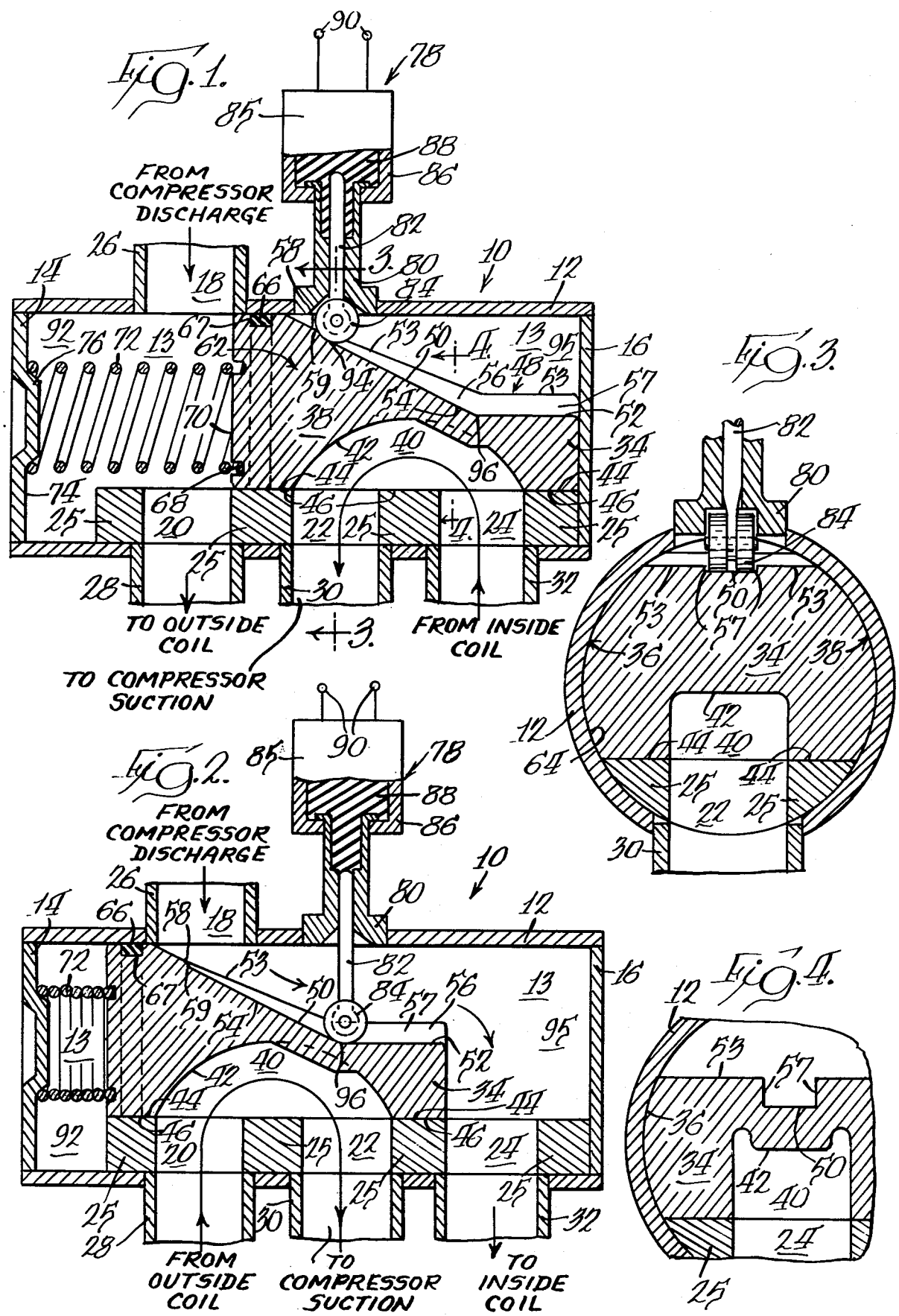

4,112,974

REVERSING VALVE

BACKGROUND OF THE INVENTION

1. Field of the Invention

This invention relates to flow control valves and, more specifically, to gas flow reversing valves used in air conditioners and heat pumps.

2. Description of the Prior Art

The use of valves to control the flow of gaseous refrigerant between a compressor and two heat exchangers in refrigeration systems of heat pumps is well known. In general, it is desired to connect the discharge side of the compressor with a first heat exchanger, which may serve as an evaporator or as a condenser. The first exchanger is connected to a second exchanger, the outlet of which is connected to the suction side of the compressor. An expansion device is usually interposed between the exchangers.

Either exchanger may serve as a condenser or as an evaporator. It may be desirable to periodically reverse the flow of refrigerant through the exchangers, so as to defrost the evaporator, for example. This may be accomplished by means of a reversing valve which shifts positions so as to allow the discharge side of the compressor to communicate with the second heat exchanger rather than with the first exchanger, thereby directing the flow of gas from the discharge of the compressor to the second exchanger. This shifting of the valve also connects the suction side of the compressor with the first exchanger, thereby reversing the flow of gas through the system and reversing the function of each exchanger.

Examples of the general type of reversing valve described above are shown in U.S. Pat. Nos. 3,976,701 (Greenawalt) and 3,369,790 (McHale).

Both Greenawalt and McHale disclose a pilot-operated reversing valve. In each patent, the valve member, located inside a valve body, is shifted by means of pistons. Gas pressure is applied to move the pistons by means of solenoid-activated pilot valves and pilot lines.

Previous reversing valves had a substantial number of restrictions within the valve body itself, causing lower efficiencies than could otherwise have been obtained. Efficiency was also hindered due to the friction caused by the sliding motion of the valve member. Also, earlier designs required independent means to provide adequate sealing of the valve member against the valve body.

SUMMARY OF THE INVENTION

It is an object of the invention to provide a compact, self-contained valve which is substantially self-sealing and which has an improved actuating mechanism.

It is another object of the invention to provide a reversing valve actuated by an expansible wax element operating a plunger wherein the required stroke of the plunger is relatively short.

It is a further object of the invention to provide a reversing valve for use in air conditioning systems and the like which does not require external actuation means, such as a solenoid.

DESCRIPTION OF THE DRAWINGS

FIG. 1 is a longitudinal central sectional view of a reversing valve embodying the features of the invention, with the valve member thereof shown in its first position;

FIG. 2 is a longitudinal central sectional view of the valve shown in FIG. 1 with the valve member shown in its second position;

FIG. 3 is a transverse sectional view of the valve of FIG. 1, taken substantially along line 3—3 of FIG. 1; and FIG. 4 is a partial transverse sectional view of the valve of FIG. 1, taken substantially along line 4—4 of FIG. 1.

DESCRIPTION OF THE PREFERRED EMBODIMENTS

Referring to FIG. 1, a valve body, generally designated 10, is illustratively provided as an integral part of a heat pump or air conditioning or refrigeration system (not shown) to control the flow of gaseous refrigerant between a compressor (not shown), an inside heat exchange coil, and an outside heat exchange coil (not shown). It will be understood that the valve as described herein may be applicable to other fluid flow applications, and that reference to a gas flow system is by way of illustration, and not by way of limitation. It will also be understood that the legends associated with the conduits in FIGS. 1 and 2 refer to an illustrative configuration of the operating environment of the invention, and are not to be understood as limiting in any way.

The valve body 10 includes a housing 12, which illustratively comprises a cylinder, and front and rear plates 14 and 16. A plurality of ports 18, 20, 22 and 24 are provided in the housing 12 and a manifold 25. The ports communicate with the discharge side of the compressor, the outside coil, the suction side of the compressor, and the inside coil, respectively, by means of a plurality of conduits 26, 28, 30 and 32.

A valve member 34 is located within a chamber 13 of the valve body 10 and has two sides 36 and 38 which are arcuate and correspond to the inner surfaces of the housing 12. (See FIGS. 1 through 4). The valve member 34 has a relatively flat lower surface 44 and an upper surface 48 which are connected by the arcuate sides 36 and 38.

An elongate cavity 40 is provided in the valve member at the lower surface 44 to allow communication between the ports 22 and 24 or between the ports 20 and 22, as will be described below. An upper surface 42 of the cavity 40 is concave and is generally arcuate so as to allow the free flow of gas therethrough with minimal resistance. The lower surface 44 of the member 34 is flat in order to provide a seal with a surface 46 of the manifold 25.

The upper surface 48 of the valve member 34 includes an inclined cam surface 50, a horizontal surface 52, and a surface 53 which extends from the surfaces 50 and 52 to the sides 36 and 38. The cam surface 50 illustratively comprises the operating surface 54 of a grooved ramp 56 located approximately centrally of the sides 36 and 38. The ramp 56 and horizontal surface 52 are illustratively provided with a pair of upstanding walls 57. The operating surface 54 of the ramp 56 is shown as being inclined slightly more steeply than is the surface 53, and forming a juncture therewith at a point 58. It is to be understood that such an arrangement is shown by way of illustration of a preferred embodiment only, and not by way of limitation. An upper section 59 of the surface 54 is inclined even more steeply than is the remainder of the surface 54.

An end 62 of the valve member 34 is generally cylindrical and has a sliding fit with an interior surface 64 of the housing 12. A seal groove 66 is provided circumferentially around the end 62, and has a sealing ring 67 therein.

A circular groove 68 is located in an exterior surface 70 of the end 62 for receipt of one end of a return spring 72 which yieldably urges the valve member 34 to its first position shown in FIG. 1. The opposite end of the return spring 72 is retained against an interior surface 74 of the end plate 14, as by fitting onto a boss 76.

Means are provided to shift the valve member 34 toward the left (as viewed in FIG. 1) in the form of an actuator, indicated generally at 78, preferably and illustratively comprising an electrically activated wax element plunger assembly.

The plunger assembly 78 is positioned centrally and to one side of the housing 12. A hollow plunger housing 80 forms an integral part of the housing 12 and encloses an elongate plunger 82. A roller 84 is rotatably attached to the lower end of the plunger 82 and is positioned within the ramp 54 of the valve member 34, as seen in FIGS. 1 and 3.

An activator 85 of the actuator 78 is an electrically activated expansible wax element of the type well-known in the art. A hollow body 86 of the activator 85 is filled with a quantity 88 of resilient rubber and a mixture of wax and various heat conducting metal powders (not shown) which is situated above the rubber. The wax is solid at ambient temperatures, but melts when exposed to temperatures substantially above ambient. An electrical resistance heating coil (not shown) is situated within the body 86 and is in contact with the wax. The coil is connected to a conventional power source and control circuit by the two connection points 90 in FIGS. 1 and 2.

When current is supplied to the coil, the wax is heated and becomes liquid. The volume of the wax increases due to the phase change and, less significantly, due to thermal expansion of the liquid. As the wax expands, pressure is exerted on the rubber 88 and, in turn, on the plunger 82, causing the plunger 82 to travel downwardly to an extended position, as shown in FIG. 2. Interruption of the flow of current to the coil will allow the wax to cool and thereby solidify and contract. Upon contraction of the wax, the rubber 88 will move back into the interior of the body 86, thereby allowing the plunger 82 to return to its retracted position (shown in FIG. 1) upon the application of only moderate vertical force to the plunger 82. As is discussed below, this force is provided by the abutment of the valve member 34 against the roller 84 as the spring 72 shifts the valve member 34 from left to right, as viewed in FIG. 1.

The configuration of the valve assembly shown in FIG. 1 corresponds to the cooling mode of a conventional air conditioner, refrigeration system or heat pump. As shown by the arrows, relatively hot, high-pressure gaseous refrigerant is discharged from the compressor through the conduit 26 and flows to the outside heat exchange coil by way of a chamber end 92 in the valve body 10. The discharge gas enters the chamber end 92 through the port 18 and exits through the port 20.

The outside coil serves as a condenser during the cooling cycle. The inside heat-exchange coil, which serves as an evaporator during the cooling cycle, is connected to the outside coil by a conduit which includes an expansion device. Relatively high-pressure, cooled refrigerant (comprising a mixture of gas and liquid) flows from the outside coil to the inside coil, where the liquid portion is vaporized and the gaseous portion is heated, thereby removing thermal energy from the environment. The gas then flows to the suction side of the compressor and the cycle is repeated. The gas flows from the inside coil to the compressor suction side by means of the conduit 32, port 24, cavity 40, port 22 and conduit 30.

In a heat pump, the functions of the inside and outside coils are reversed when the system is switched from the heating cycle to the cooling cycle. In an air conditioning or refrigeration system, it is desirable to periodically reverse the functions of the coils in order to remove frost from the outer surfaces of the inside coil. This frost accumulates during the cooling cycle as heat is withdrawn from the surrounding air, causing water vapor therein to condense and crystallize on the coil. A well-known method of defrosting involves directing the flow of hot, high-pressure discharge gas from the compressor to the inside coil, necessitating the reversal of the flow through the coils.

In the heating (or defrosting) mode, discharge gas from the compressor will flow to the inside coil, from the inside coil to the outside coil, and finally to the suction side of the compressor. This reversal in flow is accomplished by means of shifting the valve member 34 from its first position, shown in FIG. 1, to its second position, shown in FIG. 2.

When it is desired to change from the cooling mode to the heating mode of the system, an appropriate automatic control device (or manually operated switch) directs a flow of current to the coil of the wax element actuator 78, causing the wax to melt and thereby extend the plunger 82 downwardly from the position shown in FIG. 1 to the position of FIG. 2. As downward pressure is applied to the plunger 82, the roller 84 directs that force perpendicularly to the operating surface 54 of the ramp 56 at a point 94. The horizontal component of the applied force is directed toward the left, as viewed in FIG. 1, and is opposed by the spring 72, which is selected to have a resistance to compression which is at all times less than the magnitude of the horizontal component of the applied force. The vertical component of the force applied to the surface 54 serves to provide a seal between those portions of the surfaces 44 and 46 which are in contact.

The horizontal component of the applied force will initially be relatively large, since the force is initially applied to the most steeply sloped section 59 of the surface 54. This steeply sloped section 59 is provided to assure enough initial horizontal force to overcome static friction.

The application of a horizontal force to the ramp 56 as described above will cause the valve member 34 to move toward the left, as viewed in FIG. 1. As the plunger 82 continues to extend, the roller 84 will continuously apply a force which is directed substantially perpendicularly to the surface 54, thereby continuing the movement of the valve member 34.

As the valve member 34 moves from its first position to its second position, the cavity 40 moves away from the port 24, with the port 24 eventually being put in fluid communication with the port 18 through a chamber end 95, as shown in FIG. 2. This initial movement of the valve member 34 results in the port 18 communicating with the chamber end 95 thereby allowing the pressures in the chamber ends 92 and 95 to equalize. This also reduces the force required to move the valve member 34. The cavity 40 then becomes aligned with the ports 20 and 22, so as to place them in fluid communication with each other when the valve member 34 has completed its leftward shift.

This shift of the valve member 34 is completed when the roller 84 reaches a point 96, located at the juncture of the surface 54 and the surface 52, and then the roller 84 will apply a vertical force at the point 96, thereby causing the leftward shifting movement to cease and holding the valve member 34 in position.

The chamber end 92 is sealed from the chamber end 95 by virtue of the pressure applied between the surfaces 44 and 46. This results in reduced leakage of gas from the chamber end 95 to the chamber end 92, and, consequently, in reduced leakage of gas from the chamber end 92 into the cavity 40 of the valve member 34. Therefore, even though the pressure applied to the point 96 is slightly off-center with respect to the valve member 34, the relatively smaller sealing force applied to the left-hand side of the valve member 34, as viewed in FIG. 2, does not result in appreciable leakage therethrough.

It will be noted that the slope of the operating surface 54 of the ramp 56 will determine the ratio of valve member travel to plunger travel, with a relatively steep slope resulting in a relatively small amount of valve member travel compared to the length of the plunger stroke.

Slippage of the roller 84 across the upper surfaces of the valve member 34 is eliminated by the provision of the pair of upstanding walls 57 on either side of the surface 54. These walls are spaced so as to closely correspond to the width of the roller 84, and thereby provide a guide for the roller 84 during its movement.

When a change from the heating cycle to the cooling cycle of the system is desired, the flow of current to the wax element 85 is interrupted, thereby allowing the liquid wax to cool and solidify, and thereby contract. As the wax contracts, the spring 72 urges the valve member 34 toward its first position, and this causes the plunger 82 to move into the plunger housing 80. When the plunger 82 has been fully retracted, the spring 72, as well as the pressure in the chamber end 92, will tightly position the surface 54 against the roller 84, thereby imparting a force to the point 94, the vertical component of which will provide a seal at the interface of the surfaces 44 and 46, thereby preventing leakage from the chamber end 92 to the cavity 40. A similar sealing force is provided at the point 96 when the valve member 34 is in its second position, thereby preventing leakage from the chamber 95 to the cavity 40. It is important that the assembly 78 be positioned so that the plunger 82 is located generally centrally of the valve member 34 when the roller is in its first position, as the application of downward force to the central portion of the valve member 34 allows for the best possible seal between the surfaces 44 and 46.

The valve member 34 may be constructed of a variety of materials, depending on the ambient conditions, but preferably comprises molded plastic. Frictional forces acting on the valve member may thereby be minimized. It may be noted that movement of the valve member 34 occurs only when a change from the cooling cycle to the heating cycle, or vice versa, is required. The annoying hissing sound associated with pilot-operated piston reversing valves is thereby eliminated.

Due to the absence of a pilot valve, capillary tubes, or a solenoid, the valve described above is relatively compact. The disposition of the plunger assembly 78 to one side of the valve body 10, combined with the inclined ramp 54, allows a relatively short stroke of the plunger 82 to impart a relatively great degree of lateral movement to the valve member 34. Previous valve designs utilizing wax elements and plungers required a larger plunger stroke to effect substantial lateral movement. The valve design of FIGS. 1 and 2 utilizes the substantial force generated by wax element activated plungers without suffering from the disadvantage of the relatively short stroke length associated with such elements.

We claim:
1. A valve for controlling the flow of fluid between plural ports, said valve comprising:
   (a) a valve body with a chamber communicating with each of said ports;
   (b) a valve member movably mounted in said chamber for sliding movement between at least two positions to control said flow;
   (c) means for yieldably urging said valve member to one of said positions;
   (d) means for moving said valve member to the other of said positions against said urging means comprising an actuater disposed to one side of and generally centrally of said valve member and including a reciprocable plunger movable transversely to the path of said valve member; and
   (e) a cam surface on said valve member engaged by said plunger, said cam surface comprising a ramp extending longitudinally of said valve member and engaged by said plunger for movement of said plunger on said ramp, the uppermost portion of said ramp being sloped more steeply than the remainder thereof to provide initially greater motive forces as said plunger moves along said ramp.

2. A valve for controlling the flow of fluid between plural ports for use in air conditioning systems and the like, said valve comprising:
   (a) a valve body with a chamber communicating with each of said ports;
   (b) a valve member mounted in said chamber for movement between two positions to control said flow;
   (c) means for moving said valve member between said positions comprising an electrically activated wax element disposed to one side and generally centrally of said valve member, an extendable and retractable plunger operable by the wax element, to travel transversely to the path of said valve member, and a grooved ramp in said valve member extending longitudinally of the valve member to receive said plunger; and,
   (d) spring means opposing movement of said valve member caused by the extension of said plunger.

3. A flow control valve having a body with a chamber and a plurality of ports communicating with said chamber, a valve member having a relatively flat surface engaging a flat face of the valve body and having a flow passage at said flat surface, said valve member being movable between two positions to vary the connection of said flow passage to said ports, means urging said valve member to one of said positions, an inclined cam surface on said valve member at a side thereof opposite said flat surface, a reciprocable plunger operatively engageable with said cam surface, and means for exerting a force on the plunger having a magnitude sufficient to act on the cam surface and maintain said valve member and body surfaces in contact and a selectively greater force to extend the plunger to act on said cam surface and impart a component of force on said valve member in a direction to move the valve member against said urging means.

4. A valve as defined in claim 3 wherein said force exerting means comprises an electrically heated wax expansion element.

5. A valve as defined in claim 4 wherein said cam surface has its upper section operatively engaged by the plunger when retracted and said upper section has a steeper slope than the remainder thereof to provide a greater component of force to initially move the valve member.

6. A valve as defined in claim 4 wherein one of said ports opens to a first end of said chamber and at a side of the valve opposite a valve side having a port opening to a second end of said chamber, said urging means including a spring in said first end of the chamber, said valve member having a section closely fitted to said valve body to prevent leakage therepast, and the surface of the valve opposite said flat surface being relieved adjacent said valve member section to place said last mentioned ports in communication as the valve member moves against said spring.

7. A valve as defined in claim 4 wherein said valve member is of molded plastic.

8. A flow control valve for controlling the flow of fluid between plural ports for use in air conditioning systems and the like, comprising, a valve body with a chamber having a flat surface and a plurality of ports communicating with said chamber and said flat surface including a pair of ports leading to a separate pair of coils and an intermediate port connectable to compressor suction, a valve member in said chamber and having a relatively flat surface engaging said flat surface of the valve body, an arcuate flow passage in said valve body whereby positioning of the valve member in either of two positions causes said flow passage to connect one or the other of the coil ports to said intermediate port, a spring in one end of said chamber urging said valve member to one of said two positions, an inclined cam surface on said valve member at a side thereof opposite said relatively flat surface and inclined downwardly toward an end of the chamber opposite the end having said spring and having an initial section at a steeper slope, a reciprocable plunger movably guided by said valve body for movement in a direction normal to the movement of the valve body and having a roller engaging said inclined cam, an electrically-activated wax element associated with said plunger for causing movement of the plunger whereby extension of the plunger moves the valve member against the action of the spring, a surface at the end of the inclined cam engaged by said roller after movement of the valve body whereby a force exerted by the plunger maintains said flat surfaces in sealing engagement, an additional port opening to said chamber at a side of the valve body opposite said flat surface an opening to the end of the chamber having the spring, said valve member having a section closely fitted to said valve body to prevent leakage therepast, and the surface of the valve member opposite said flat surface being relieved adjacent said valve member section to place said additional port in communication with a different one of said coil ports as the valve member is moved against the action of said spring.

9. A valve for controlling the flow of fluid between plural ports, said valve comprising:
 (a) a valve body with a chamber communicating with each of said ports;
 (b) a valve member movably mounted in said chamber for sliding movement between at least two positions to control said flow;
 (c) means for yieldably urging said valve member to one of said positions;
 (d) means for moving said valve member to the other of said positions against said urging means comprising an actuater disposed to one side of and generally centrally of said valve member and including a reciprocable plunger movable transversely to the path of said valve member; and
 (e) a cam surface on said valve member engaged by said plunger, said cam surface comprising a ramp extending longitudinally of said valve member and engaged by said plunger for movement of said plunger on said ramp, said plunger including a roller on its lower end for engagement with and movement on said ramp.

10. A flow control valve having a body with a chamber having a face and a plurality of ports at said face communicating with said chamber, a valve member having a surface engaging said face of the valve body and having a flow passage at said surface movable between two positions to vary the connection of said flow passage to said ports, means urging said valve member to one of said positions, a cam surface on said valve member at a side thereof opposite said surface, a reciprocable plunger operatively engageable with said cam surface, and means for exerting a force on the plunger having a magnitude sufficient to act on the cam surface and maintain said valve member and body in contact and a selectively greater force to extend the plunger to act on said cam surface and impart a component of force on said valve member in a direction to move the valve member against said urging means.

* * * * *